3 Sheets—Sheet 1.
S. C. BLODGETT & J. A. LEROW.
SEWING MACHINE.
No. 188. Reissued Jan. 14, 1851.
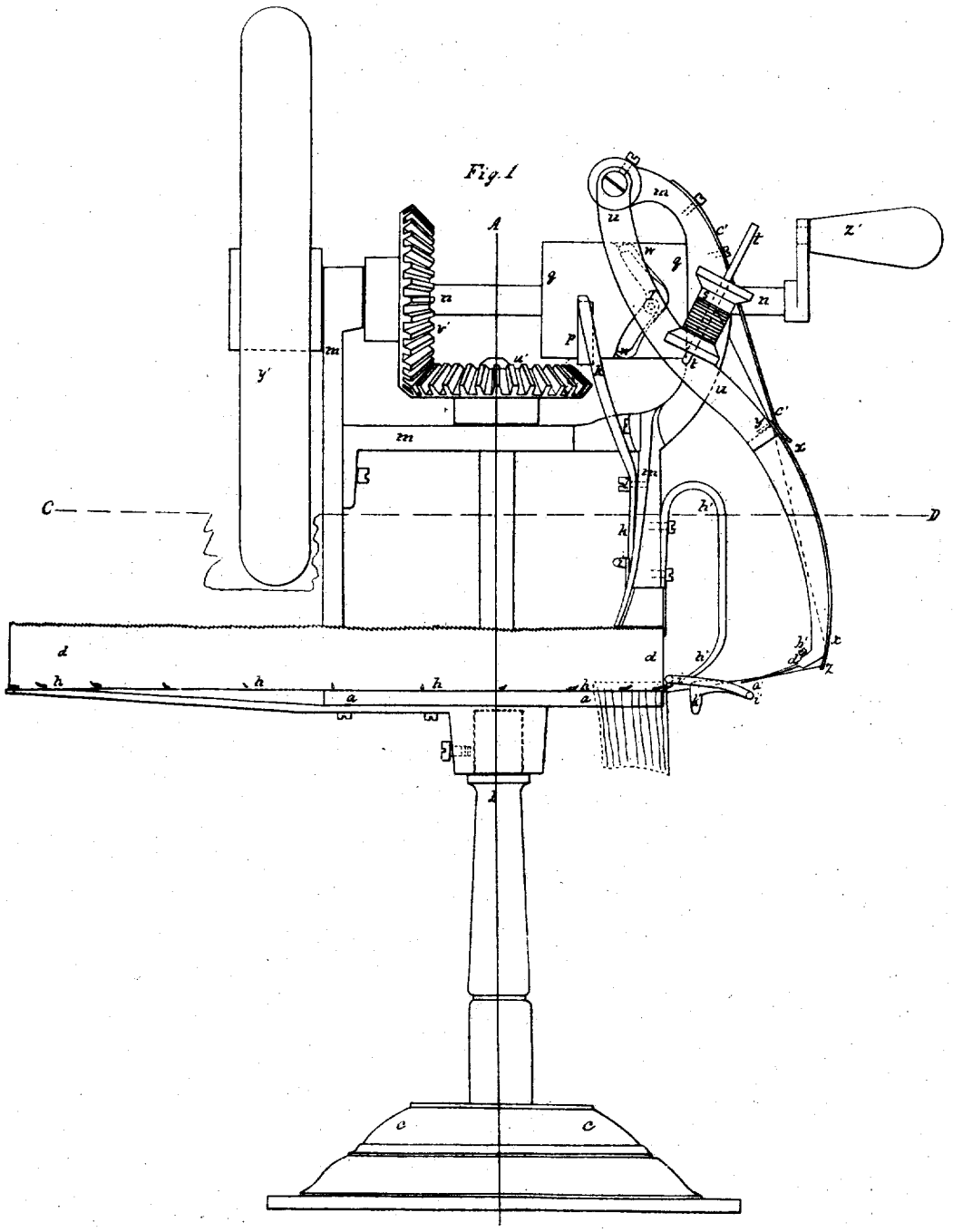
THE NORRIS PETERS CO., PHOTO-LITHO., WASHINGTON, D. C.

S. C. BLODGETT & J. A. LEROW.
SEWING MACHINE.
No. 188. Reissued Jan. 14, 1851.
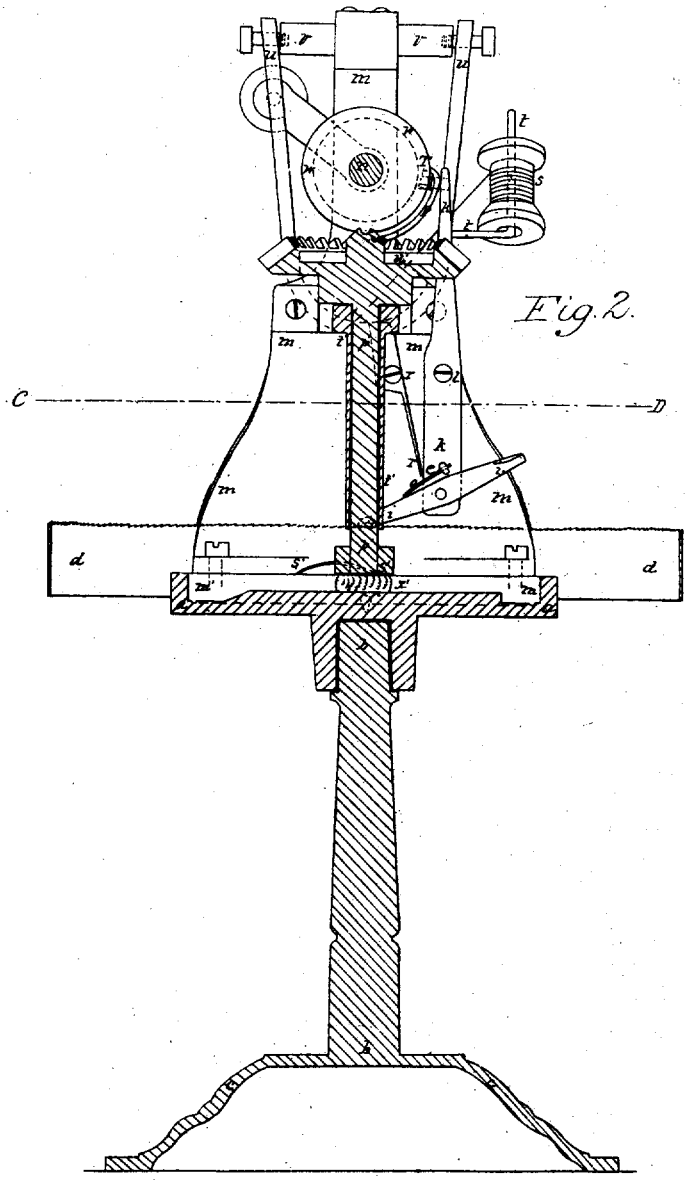
THE NORRIS PETERS CO., PHOTO-LITHO., WASHINGTON, D. C.

S. C. BLODGETT & J. A. LEROW.
SEWING MACHINE.
No. 188. Reissued Jan. 14, 1851.
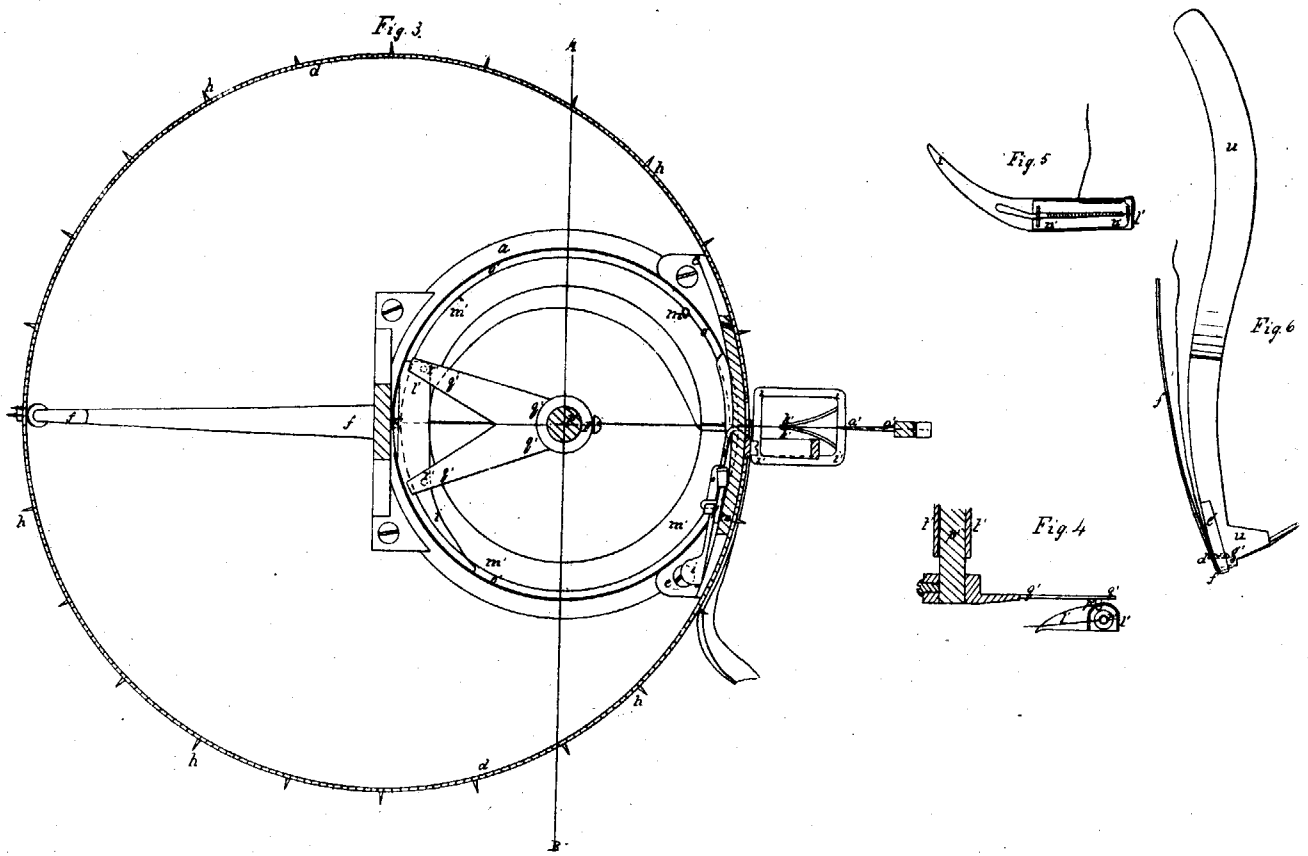
THE NORRIS PETERS CO., PHOTO-LITHO., WASHINGTON, D. C.

UNITED STATES PATENT OFFICE.

SHERBURNE C. BLODGETT, OF GEORGETOWN, AND JOHN A. LEROW, OF BOSTON, MASSACHUSETTS.

IMPROVEMENT IN SEWING-MACHINES.

Specification forming part of Letters Patent No. 6,766, dated October 2, 1849; Reissue No. 188, dated January 14, 1851.

*To all whom it may concern:*

Be it known that we, SHERBURNE C. BLODGETT, of Georgetown, in the county of Essex and State of Massachusetts, and JOHN A. LEROW, of Boston, in the county of Suffolk and State aforesaid, have invented certain new and useful Improvements in Sewing-Machines; and we do hereby beclare that the following description, taken in connection with the accompanying drawings, hereinafter referred to, forms a full and exact specification of the same, wherein we have set forth the nature and principles of our said improvements, by which our invention may be distinguished from others of a similar class, together with such parts as we claim and desire to have secured to us by Letters Patent.

The figures of the accompanying plates of drawings represent our new "rotary sewing-machine," as we term it.

Figure 1, Plate 1, is a side elevation of the same. Fig. 2, Plate 1, is a vertical section taken in the plane of the line A B, Fig. 1, Plate 1, and Fig. 3, Plate 2. Fig. 3, Plate 2, is a horizontal section taken in the plane of the line C D, Figs. 1 and 2, Plate 1. Fig. 4, Plate 2, is a detail sectional view taken on the line E F, Fig. 3, Plate 2; and Figs. 5 and 6, Plate 2, are detail views, which will be referred to in the sequel.

Our machine is distinguished from all other sewing-machines now known to us in several points very essential to the accomplishment of any valuable results from the machine and any real practical advantages over hand-work. In the first place, it differs from all other machines in being a rotary sewing-machine, the feeding-bar, having hooks on which the cloth is confined and carried round, being circular, so that any length of cloth to be seamed may be consequently pressed onto and passed along on the same. In the second place, the filling-thread for making the stitch hold is carried round in a rotary shuttle instead of a vibrating one, which is a great desideratum, as the machine for driving the former may be made much simpler and more substantial, while it can also be driven with much greater speed than the vibrating shuttle without any danger. The other points of improvement will be indicated and more clearly comprehended in the description of the machine as we proceed with it.

The operative parts of the machine are supported on a circular metallic plate, *a a*, on the top of a pillar, *b b*, which is fitted in the center of the circular standard-plate *c c*.

*d d* is the circular supporting-bar for holding the two pieces or edges of the cloth to be seamed or united by sewing. It is arranged eccentrically in reference to the circular plate *a a*, being supported on a horizontal projection, *e e*, from said plate on one side and on an arm, *f f*, fastened to said plate on the other or opposite side, as shown in Fig. 3, Plate 2, said arm having a friction-roller, *g*, bearing against the inner side of said bar, to guide its rotary motion. On the exterior face of this bar are fitted, at proper intervals apart, the curved or hooked supporting-pins *h h h h*, on which the two edges of the cloth to be pinned are to be pressed, and on and all around the top edge of said bar are cut suitable rack-teeth, as shown in the several figures. A pawl, *i i*, Fig. 2, Plate 1, engages at one end with the rack-teeth on said bar above referred to, being connected near its center to the vertical lever *k k*, which lever is secured by a fulcrum-pin, *l*, to the interior of the supporting frame-work *m m m m*, Figs. 1 and 2, Plate 1, and Fig. 3, Plate 2, of the driving-shaft *n n*, said frame-work resting on the circular plate *a a*, before referred to. The pawl is kept in connection with the rack-teeth by means of the spring *o*, connected to the foot of the lever *k k*, and said lever has an intermittent vibrating motion imparted to it by means of a cam, *p*, formed on the drum *q q* on the driving-shaft *n n*, the upper end of said lever bearing against said cam, and a spring, *r r*, pressing against the foot of said lever, serving to keep the upper end of the lever against the cam and drum.

The "needle-thread," as we term it, is represented by blue lines in the several principal figures, and is delivered from the spool *s*, which turns loosely on the spindle *t t*, connected to the vibrating needle-holder *u u u*, as shown in Figs. 1 and 2, Plate 1. This needle-holder is forked at its upper end, as shown in Fig. 2, Plate 1, so as to embrace a journal or axle, *v v*, which has proper bearings on the top of the supporting frame-work *m m m*, &c., and said holder is vibrated by means of a cam-groove, W W, properly cut for the purpose in the drum *q q* on the driving-shaft, into which groove a friction-roller, T, connected to the inside of the needle-holder is fitted, as shown in Fig. 2, Plate 1, and by dotted lines in Fig. 1, Plate 1. The needle-holder is bent into the shape shown in Fig. 1, Plate 1, and has on its back a long spring, *x x*, confined to the same near its center, said spring having a guiding-pin, *y*, at its upper end, and a guiding-hole, *z*, at its lower end, over and through which, respectively, the thread passes to the under side of the needle *a′ a′*. Said needle is confined in the lower end of the holder by the confining-screw *b′*, and has a hole or eye a little in rear of its point, as shown in Fig. 1, Plate 1, and Fig. 3, Plate 2, which should be small enough to keep the thread from falling back of its own weight. The needle-thread passes up through the eye of the needle, and is carried by the same through the cloth, and a proper opening or space cut in the plate *a a*, across the shuttle race or groove in said plate, (hereinafter referred to, in which the shuttle moves.) Then, when the needle begins to be retracted, a loop of the needle-thread is thrown up, through which the shuttle, with the filling-thread, passes, as will be hereinafter explained.

It is vitally essential to the proper operation of the machine that when the needle goes forward the thread shall be free to be drawn through the eye of the needle, in order that the loop may be sufficiently enlarged to permit the shuttle to pass through the same, and as essential when the needle is retracted by the back vibration of the holder that the thread shall be rigidly held against the holder, in order that the stitch may be effectually tightened. This is provided for by the use of a wide spring, *c′ c′*, attached to the upper part of the supporting frame-work *m m*, &c., and so arranged in relation to the vibrating needle-holder *u u u* that the spring *x x* on the back of said holder, under which the thread passes, as before explained, shall abut against the lower end of the wide spring *c′ c′* and confine the thread, as described. Another method of accomplishing the same result is represented in Fig. 6, Plate 2, the guiding-pin for the thread being near the bottom of the holder, as shown at *d′*, and the confining spring being a short one, and arranged on the side of the holder opposite said pin, as shown at *e′*, while the tightening-spring is a bent lever-spring, *f′ f′*, fitting at the lower end in a proper slot formed in the heel of the holder, where it has a fulcrum, its upper end being so arranged as to abut against some stationary part of the frame-work at the proper time to hold the thread, as before explained, said thread passing across the holder from the guiding-pin *d′*, under said spring, to the guiding-hole *g′* under the confining-spring *e′*, as shown in said Fig. 6.

The bent spring *h′ h′*, Fig. 1, Plate 1, supports the small four-sided frame *i′ i′ i′ i′*, the exterior of the inner side of which frame bears against the cloth on the supporting-bar *d d*, just above the hooks on the same, (the needle entering just below said hooks,) and keeps the cloth in position when the needle is withdrawn. This small frame *i′ i′ i′ i′* also sustains the converging nipper-springs *k′ k′*, between which the needle and its thread pass on their passage to the cloth, and when the needle is withdrawn these springs serve to keep the thread up sufficiently high to prevent the point of the needle, on its return, from splitting or becoming entangled with the same.

*l′ l′*, Figs. 3, 4, and 5, Plate 2, is the shuttle for carrying the filling-thread, which thread is represented by green lines in the several figures. It is curved at its front part, as shown in the aforesaid figures, so as to be revolved in the shuttle-race *m′ m′ m′ m′*, formed in the circular plate *a a*, said shuttle-race being made sufficiently wide to permit the rear end of the shuttle to be made straight for the insertion of the spool *n′ n′*, on which the filling-thread is wound. The front of the shuttle is beveled or tapered down to a point, which travels in a narrow circular guiding-groove, *o′ o′ o′*, formed near the exterior of the shuttle-race and below the bottom of the same, so that the shuttle shall invariably pass through the loop of the needle-thread, formed as before described. The shuttle *l′ l′* is connected to and driven by the vertical rotating shaft *p′ p′*, Fig. 2, Plate 1, and Figs. 3 and 4, Plate 2, by means of the two spring-arms *q′ q′ q′ q′*, set at an acute angle, as shown in said Fig. 3, but which may be made curved in the arc of a circle or circles, said arms having at their outer ends suitable pins or studs, *r′ r′*, which engage with corresponding holes formed in the top of the straight part of the shuttle; or, instead of said pins, the arms may be arranged with a slight projection, fitting said holes in the shuttle. As the shuttle passes through the loop of the needle-thread, it is necessary that these spring-arms should be alternately disconnected from the shuttle, and this is effected by means of a cam-ledge, *s′ s′*, formed in the inside of the frame-work *m m m*, directly over that part of the shuttle-race *m′ m′*, &c., where the loop is formed, and so curved, as shown in Fig. 2, Plate 1, as to raise said arms alternately, so that one or the other of said arms will be always driving the shuttle, in a manner which will be readily understood by the inspection of said Fig. 2. The vertical shaft *p′ p′* turns in the vertical tubular bearing *t′ t′*, Fig. 2, Plate 1, secured to the frame-work *m m m*, &c., and is connected by a bevel-gear wheel, *u′*, on its top to a similar wheel, *v′*, on the driving-shaft *n n*, so that a rapid rotary motion may be imparted to said shuttle, as hereinbefore suggested. A pad or thick washer, *x′*, made of any suitable substance, should be placed between the under side of the spring-arms *q′ q′* on the bottom of the shaft $p'$ $p'$ and the circular face of the plate $a$ $a$ on the inner side of the shuttle-race, in order to keep the filling-thread straight during the rotating of the shuttle. Otherwise the connecting-pins on said arms would get entangled with said thread.

It should be here observed that is better to have the shuttle revolve in the opposite direction to that indicated, as it makes the stitch better by avoiding the putting of any further twist in the filling-thread, which is liable to make a kink in the stitch.

The driving-shaft $n$ $n$ has a fly-wheel, $y'$, on one end, and may be driven by hand applied to the crank $z'$, or by a band from any driving machinery.

Having thus fully described our improved sewing-machine, we shall state our claims as follows:

What we claim as our invention, and desire to have secured to us by Letters Patent in the above-described rotary sewing-machine, is—

1. Arranging the shuttle which carries the filling-thread so that it shall revolve horizontally in a circular shuttle-race, said shuttle being constructed with a curved front and pointed nose, which shall travel in a circular guiding-groove sunk below the bottom of said race, so that the shuttle shall invariably pass through the loop formed in the needle-thread, all as hereinabove set forth.

2. The pad or washer under the spring-arms which carry the shuttle, for keeping the filling-thread straight, as hereinbefore explained.

3. The combination of the wide spring $c'$ $c'$ and the bent lever-spring $f'$ $f'$, operating as hereinabove described, or any contrivance substantially equivalent thereto, for relaxing the needle-thread when the loop is to be formed, and holding it rigidly when each stitch is to be tightened, as hereinabove set forth.

4. The converging nipper-springs, through which the needle, &c., passes, to keep the thread up and prevent the needle from splitting or breaking it, as hereinabove set forth.

5. The combination and arrangement of the spring-arms $q'$ $q'$ $q'$ $q'$ with the cam-ledge $s'$ $s'$, or any other means essentially the same, for the purpose of disconnecting alternately said arms from the shuttle for the purpose of allowing the shuttle to pass through the loop, as herein described and represented.

SHERBURNE C. BLODGETT.
JOHN A. LEROW.

Witnesses to the signature of Sherburne C. Blodgett:

JOSIAH OAKES,
WM. R. DIKEMAN.

Witnesses to the signature of John A. Lerow:

T. C. DONN,
A. B. STOUGHTON.